United States Patent [19]

Hirosawa et al.

[11] Patent Number: 4,866,512
[45] Date of Patent: Sep. 12, 1989

[54] METHOD OF AND APPARATUS FOR READING IMAGE IN CORRECTED READ TIMING

[75] Inventors: Makoto Hirosawa; Shigeru Sasada, both of Kyoto, Japan

[73] Assignee: Dainippon Screen Mfg. Co., Ltd., Kyoto, Japan

[21] Appl. No.: 219,003

[22] Filed: Jul. 14, 1988

[30] Foreign Application Priority Data

Jul. 15, 1987 [JP] Japan ................................ 62-176486

[51] Int. Cl.⁴ ...................... H04N 1/04; H04N 1/024; H04N 1/028
[52] U.S. Cl. ...................................... 358/75; 358/78; 358/494
[58] Field of Search ..................... 358/75, 80, 78, 285, 358/293

[56] References Cited

U.S. PATENT DOCUMENTS

| | | | |
|---|---|---|---|
| 3,975,760 | 8/1976 | Yamanaka | 358/50 |
| 4,007,488 | 2/1977 | Morishita et al. | 358/41 |
| 4,264,921 | 4/1981 | Pennington | 358/78 |
| 4,375,647 | 3/1983 | Mir | 358/75 |

FOREIGN PATENT DOCUMENTS

| | | |
|---|---|---|
| 0154348 | 12/1979 | Japan . |
| 0123158 | 7/1985 | Japan ................................ 358/75 |
| 0128269 | 6/1987 | Japan . |

OTHER PUBLICATIONS

Japanese Patent Laying Open Gazette No. 60-176360.
Japanese Patent Laying Open Gazette No. 61-108253.

Primary Examiner—James J. Groody
Assistant Examiner—Jerome Grant
Attorney, Agent, or Firm—Lowe, Price, LeBlanc, Becker & Shur

[57] ABSTRACT

Three linear image sensors (14B, 14G and 14R) read the image of an original (1) being moved along the subscanning direction (−Y), by receiving lights ($L_B$, $L_G$ and $L_R$) from respective instantaneous reading lines ($W_B$, $W_G$ and $W_R$), respectively. Scanning line switching clocks serving as sensor drive timing signals are supplied from a control circuit (20) to the linear image sensors, respectively. These clocks are time-shifted from each other by the time shift values calculated from deviations between the instantaneous reading positions and scanning line pitch, thereby the linear image sensors read common scanning lines.

16 Claims, 8 Drawing Sheets

METHOD OF AND APPARATUS FOR READING IMAGE IN CORRECTED READ TIMING

BACKGROUND OF THE INVENTION

1. Field of the Invention

The present invention relates to a method of and an apparatus for reading image which can be employed in a color process scanner of a flat bed type and the like, and more particularly, it relates to a technique to compensate a positional reading error caused in serially reading an original image for every scanning line pitch with linear image sensors.

2. Description of the Prior Art

In a color process scanner and the like, three linear image sensors are provided corresponding to red, green and blue light components included in an incident light from an original, so that red, green and blue components of the original image are read by the three sensors for each pixel, respectively. The color image data for the respective color components obtained by reading the original image with the linear image sensors, or another data obtained by correcting the color image data is employed to produce a record image, which may be either a color separation image or a reproduced color image.

Therefore, in such an image reader, it is important to adjust a relation between the image reading positions of respective linear image sensors. If the image reading positions are not properly adjusted to each other, color light components from different positions on the original are composed, to give a reproduced image having positional color mismatch.

One of the most fundamental technique to prevent the problem is shown in FIG. 1. An image reading light L from a reading line W on an original 1 is led to an optical color separator 3 through a lens 2, by which the light L is separated into color components to be given to linear image sensors 4a to 4c, respectively. In the method, however, since the light L is separated into the color components, the light flux reading each one of the linear image sensors is decreased. Further, the optical color separator 3 having high resolution should be employed, so that the size and fabrication cost of the image reader are increased.

One the other hand, another technique has been developed, in which the positional reading error is compensated through adjusting a relation between image data output timings of respective linear image sensors rather than through employing the optical color separator, so that the light flux of the image reading light is not decreased. For example, an image reader shown in FIG. 2 is so constructed that images on different reading lines $W_a$ to $W_c$ are read by linear image sensors 4a to 4c detecting different color components, respectively.

In this case, when a subscanning is achieved by moving an original 1 to the direction ($-Y$), an image information of a pixel P is first read by the linear image sensor 4a, and then serially read by the other linear image sensors 4b and 4c, in this order. The respective color component data of the pixel P are delivered from the linear image sensors 4a to 4c, respectively, in the different timings.

In order to compensate the timing difference, the color component data delivered from the linear image sensors 4a and 4b, which read the pixel P prior to the linear image sensor 4c, are given to buffer memories 5a and 5b. The color component data are delivered from the buffer memories 5a and 5b with delay times respectively, so that the color component data $S_a$ to $S_c$ corresponding to the common pixel, and therefore, corresponding to a common scanning line are simultaneously outputted.

In an image reader such as that of FIG. 2 having no optical color separator, instantaneous reading lines $W_a$ to $W_c$ of FIG. 3 detected by the linear image sensors 4a to 4c at a same time are separated from each other at intervals of a predetermined distance A. The valve of the distance A depends on the geometric relations between respective elements in the image reader and the magnification of the lens 2. On the other hand, the width d of scanning lines $l_0, l_1, \ldots$ is determined according to the reproducing magnification in image recording. When the linear image sensors 4a to 4c are constructed as CCD (charge coupled device) linear arrays, the "scanning lines" are defined as a strip region on the original scanned by the instantaneous reading lines $W_a$ to $W_c$ with the movement of the original 1 in the direction ($-Y$) for one charge storage period of CCD photocells. In FIG. 3 and FIG. 4B which will be explained later, the width of the scanning lines is illustrated exaggeratedly.

Accordingly, the relation between the distance A and the width d may be variable, and the distance A is not always integral multiples of the value of the width d. Especially, the value of the width d can be continuously varied, and a mismatch between the distance A and the width d is caused inevitably.

When such a mismatch is caused, the linear image sensor 4c serially reads the image informations on the scanning lines $l_0, l_1, \ldots$ of FIG. 3, for example, while the other linear image sensor 4b serially reads the image informations on the scanning lines $l_0, l_1, \ldots$, which are in the positions deviated from the scanning lines $l_0, l_1, \ldots$, since the respective read timings in the linear image sensors 4a to 4c are common to these sensors. Such a deviation is caused also in the linear image sensor 4a.

Therefore, even if the output timings of the color component data from the linear image sensors 4a to 4c are adjusted with the buffer memories 5a and 5b, an image data faithful to the original image cannot be obtained, since the scanning lines read by the respective image sensors are essentially different from each other.

The magnitude of the positional color mismatch caused by the situation indicated above is smaller than the scanning line pitch d, and it is almost negligible in an ordinary image recording. However, it is important to effectively prevent the influence caused by the scanning line deviation, when an extreme high resolution image recording is required or the image recording is intended for an original on which optical density or color tone is drastically changed in a certain region.

SUMMARY OF THE INVENTION

The present invention is intended for a method of reading an image of an original sequentially along scanning lines defined on the original.

According to the present invention, the method comprises the steps of (a) preparing linear image sensors extending along a main scanning direction and arrayed in a subscanning direction with a predetermined spacing; (b) relatively moving the original and the linear image sensors in the subscanning direction so that a light from the image of the original is received in the linear image sensors for each scanning line, and (c)

reading the image of the original with the linear image sensors for each scanning line while performing the step (b), wherein respective read timings in the linear image sensors are controlled by sensor drive timing signals supplied to the linear image sensors, respectively, and the sensor drive timing signals are time-shifted from each other by a time shift value dependent on a decimal part of a characteristic value obtained by dividing a deviation between respective instantaneous reading positions of the linear image sensors in the subscanning direction by a scanning line pitch with which the scanning lines are arrayed in the subscanning direction.

Preferably, the time shift value is T1 (1-γ), where T1 is a time required for the linear image sensors to read the image of the original by one scanning line, and γ is the decimal part.

According to an aspect of the present invention, the linear image sensors have first and second linear image sensors, and the sensor drive timing signals include first and second sensor drive timing signals supplied to the first and second linear image sensors, respectively.

The first linear image sensor receives a light from the image of the original at latest timing within the linear image sensors when the original and the linear image sensors are relatively moved according to step (b). The second sensor drive timing signal is delayed by the time shift value from the first sensor drive timing signal.

According to another aspect of the present invention, the linear image sensors further have a third linear image sensor, the first to third linear image sensors being adapted to read different color components of the image, respectively the sensor drive timing signals further include a third sensor drive timing signal supplied to the third linear image sensor. The second and third sensor drive timing signals are delayed from the first sensor drive timing signal by first and second time shift values, respectively. The first and second time shift values are individually obtained on the basis of a first deviation between respective instantaneous reading positions of the first and second linear image sensors and a second deviation between respective instantaneous reading positions of the first and third linear image sensors, respectively.

The linear image sensors may be formed on a common substrate in parallel to each other, thereby to be prepared as a multi-row image sensor.

The present invention also provides an image reader for reading an original image according to the method described above. The image reader is characterized in that it has sensor drive timing signal generating means for generating the sensor drive timing signals being time-shifted by the time shift valve indicated above.

Since the sensor drive timing signals are time-shifted from each other to compensate the irregularity in which the deviation between the respective instantaneous reading positions of the linear image sensors is not integer times the scanning line pitch, the linear image sensors read common scanning lines, thereby to correct image data without positional color mismatch and the like.

Accordingly, an object of the present invention is to provide a method of reading image and an image reader which can correctly read the original image without positional color mismatch even if a deviation between respective instantaneous reading lines of the linear image sensors is not integral multiples of the scanning line pitch.

Another object of the present invention is to correctly read a color original image by linear image sensors without color separation system such as a prism.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
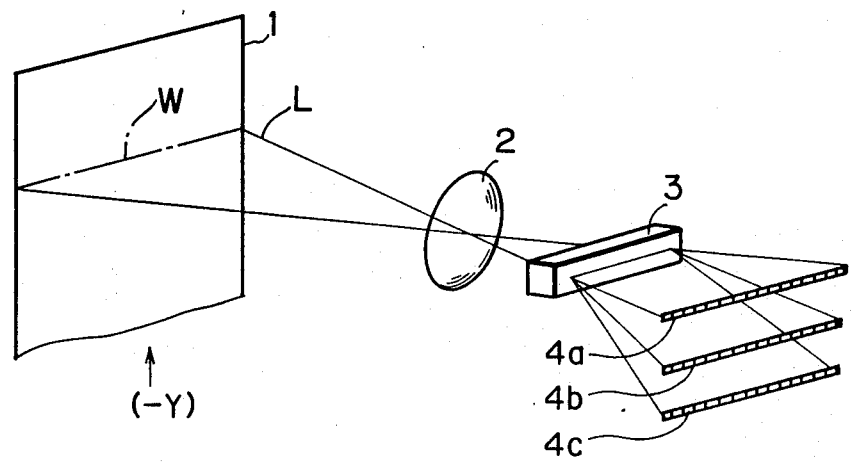
FIG. 1 through FIG. 3 are explanatory diagrams showing conventional image readers.
Figure 2:
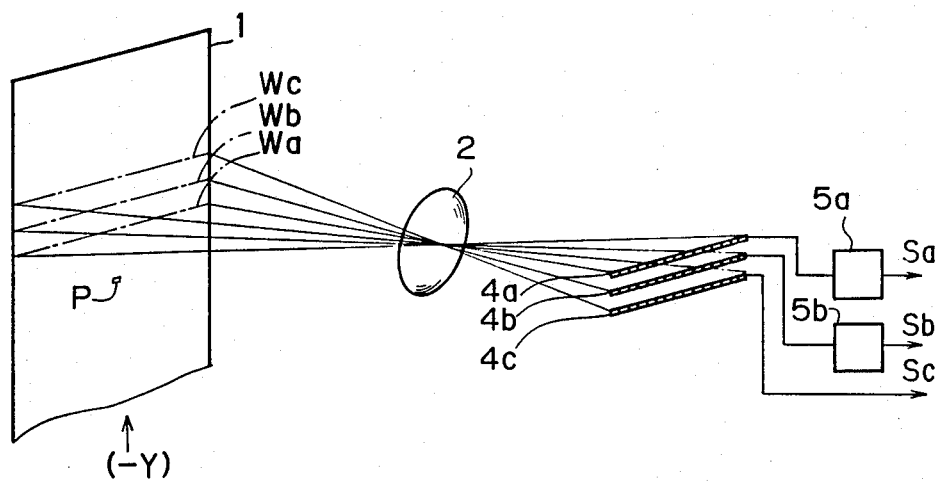
Figure 3:
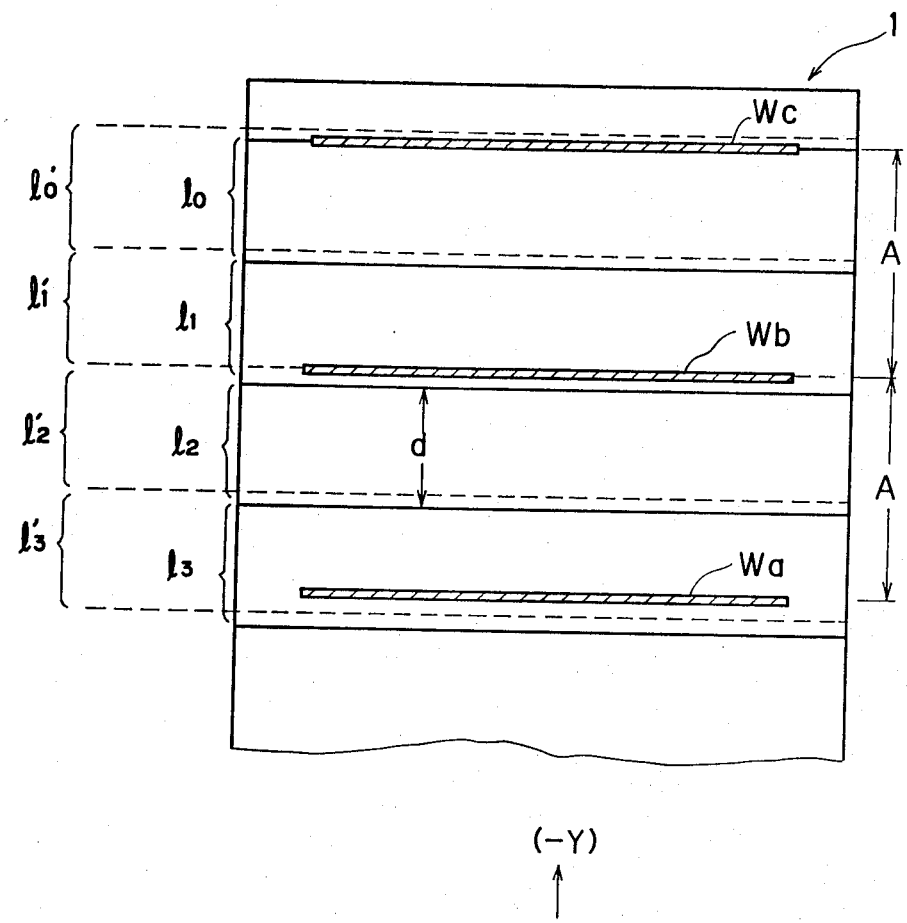
Figure 4A:
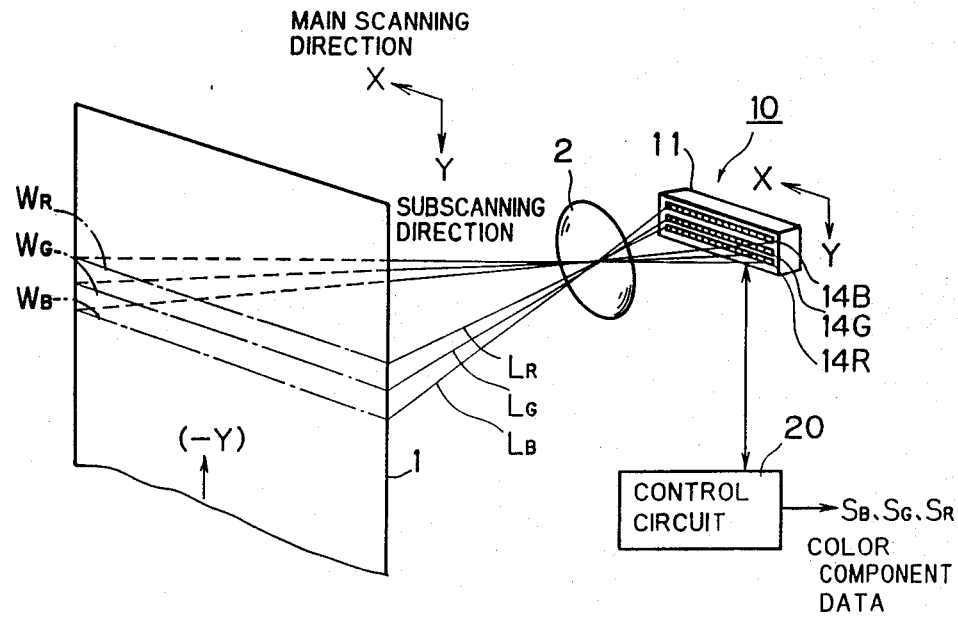
FIG. 4A is a diagram showing overall structure of a preferred embodiment of the present invention.
Figure 5:
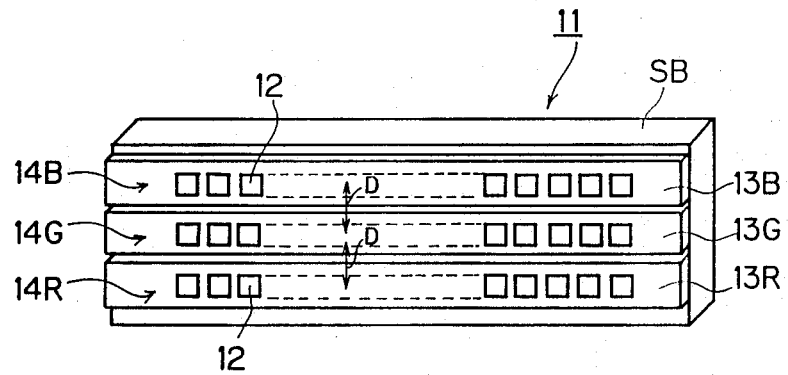
FIG. 5 is a perspective view of a multi-row image sensor.

FIG. 4A is a diagram showing overall structure of an image reader according to a preferred embodiment of the present invention. The image reader 10 is provided with a multi-row image sensor 11 of optically detecting or reading the image of an original 1. As shown in FIG. 5, the multi-row image sensor 11 has three linear image sensors 14B, 14G and 14R, each of which includes a linear array of CCD photocells 12. The linear image sensors 14B, 14G and 14R are formed and integrated on a common substrate SB while being arrayed in parallel into three rows. On the respective surfaces of the photocell rows, a blue filter 13B, a green filter 13G and a red filter 13R are fixed, respectively.

Referring to FIG. 4A again, an image forming lens 2 is provided in front of the light receiving surface of the multirow image sensor. The original 1 to be read is positioned at a place facing the multi-row image sensor 11 through the lens 2. A main scanning is achieved through the process where the photocells included in each of the linear image sensors 14B, 14G and 14R are serially accessed in the longitudinal direction of the linear image sensors to serially read the linear image on the original 1 for each pixel. Therefore, the longitudinal direction of the linear image sensors 14B, 14G and 14R coincides with a main scanning direction X in image reading for the original 1.

The original is being moved with a transporting mechanism (not shown) in a direction ($-Y$) orthogonal to the main scanning direction X at a constant speed V. Accordingly, the linear image sensors 14B, 14G and 14R, and the original 1 are relatively moved in the direction ($-Y$) at the speed V, and a subscanning direction is defined by the direction Y.

Under the conditions described above, the linear image sensors 14B, 14G and 14R being arrayed into the multi-row structure receive lights $L_B$, $L_G$ and $L_R$ from the instantaneous reading lines $W_B$, $W_G$ and $W_R$ on the original 1 at each moment, respectively. In FIG. 4A, the lights $L_B$, $L_G$ and $L_R$ are illustrated only by their respective center planes of light pass. Charge-storage and charge-transfer operations for the CCD photocells in each of the linear image sensors 14B, 14G and 14R are repeated with a predetermined repeating period, while moving the original 1 in the direction (−Y). Since the color filters 13B, 13G and 13R are provided on the surfaces of the linear image sensors 14B, 14G and 14R, respectively, the linear image sensors 14B, 14G and 14R receive the blue, green and red light components included in the light from the original 1, respectively, and photoelectrically convert the color light components into color component electric signals.

An image read timing control in the multi-row image sensor 11 and a transfer control of the color component data are performed by means of a control circuit 20. The image reader 10 of FIG. 4A has an image read timing correcting function. The principle of the image read timing correction will be described below, with reference to FIG. 4B.

Figure 4B:
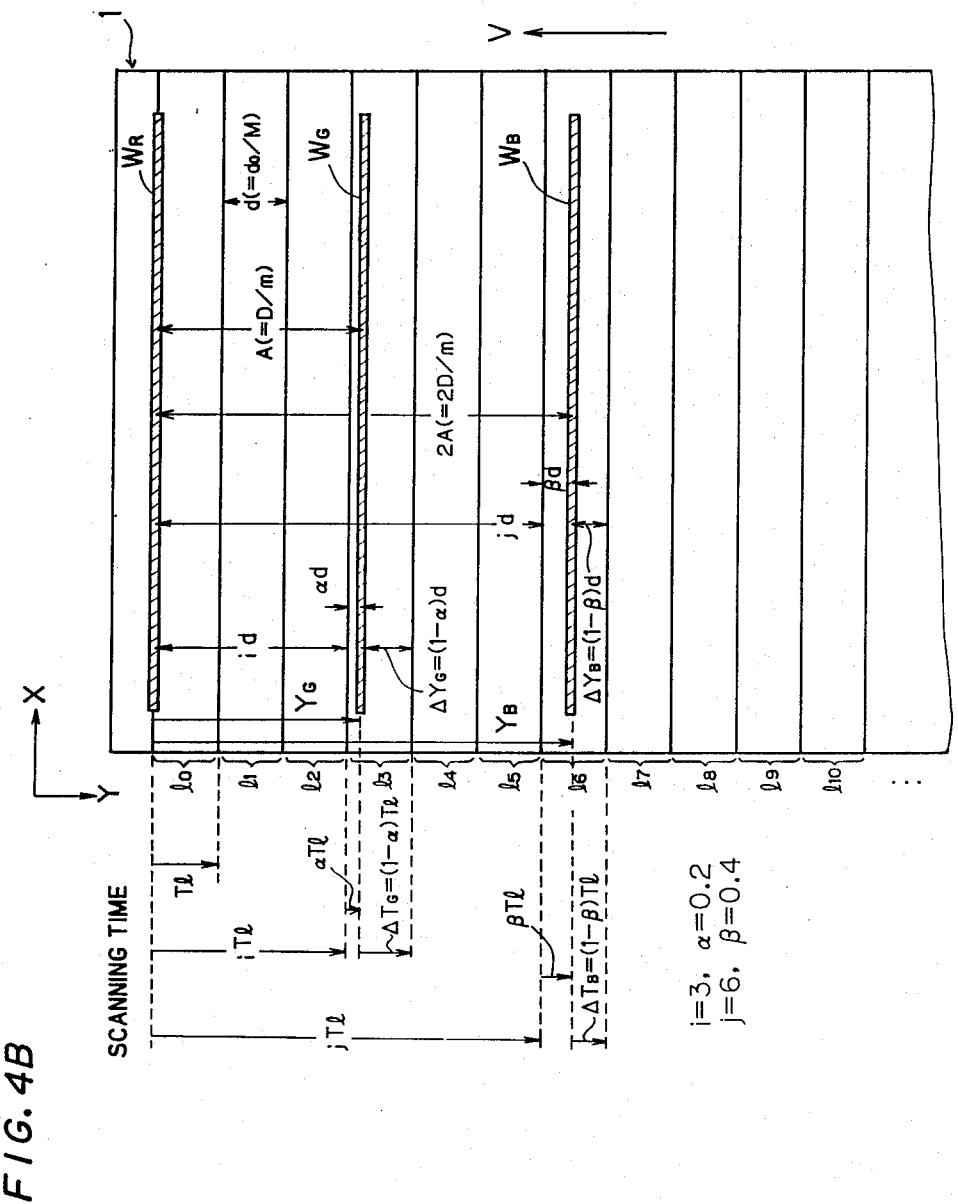
FIG. 4B is an enlarged view of a part of an original shown in FIG. 4A.

FIG. 4B is an enlarged schematic diagram showing a part of the original 1, where the symbols indicated therein are defined as follows:

D. . . . Spacing with which the linear image sensors 14B, 14G and 14R are arranged (see FIG. 5);

m . . . Optical magnification factor obtained by the lens 2;

A (=D/m) . . . Spacing with which the instantaneous reading lines $W_R$, $W_G$ and $W_B$ for the linear image sensors 14R, 14B and 14G are arrayed, namely, a displacement between reading positions being read by relatively neighbouring two linear image sensors, respectively;

M (not shown) . . . Reproduction magnification when the image of the original 1 is recorded on the basis of the image data obtained through the image reading, where a record scanning pitch in a recorder (not shown) is assumed to be fixed, and the reproduction magnification factor M is changed through a change of the moving speed V of the original 1;

$V_0$ (not shown) . . . Moving speed V of the original 1 in case of a full scale recording (M=1);

V (=$V_0$/M) . . . Moving speed of the original 1 in an arbinary magnification recording, i.e., arbitrary value of M;

$d_0$ (not shown) . . . Scanning line pitch or sampling pitch in the full scale recording (M =1);

d (=$d_0$/M) . . . Scanning line pitch in the arbitrary magnification recording (arbitrary M);

Tl (=$d_0$/$V_0$=d/V) . . . Time required for reading an image information on one scanning line. The time Tl corresponds to a time required for the instantaneous reading lines $W_B$, $W_G$ and $W_R$ for the linear image sensors 14B, 14G and 14R to move on the original 1 by the distance of the scanning line pitch d through the movement of the original 1. Since the linear image sensors are so constructed to have the CCD photocells, the time Tl is almost equal to the charge storage period per unit reading operation in the CCD photocells.

Within these parameters, the value of the magnification factor M is externally given prior to the individual image reading, while the values of the parameters D, m, A, $V_0$, $d_0$ and Tl are previously set in the image reader. The values of the other parameters V and d are calculated from the values of $V_0$, $d_0$ and M.

Figure 6:
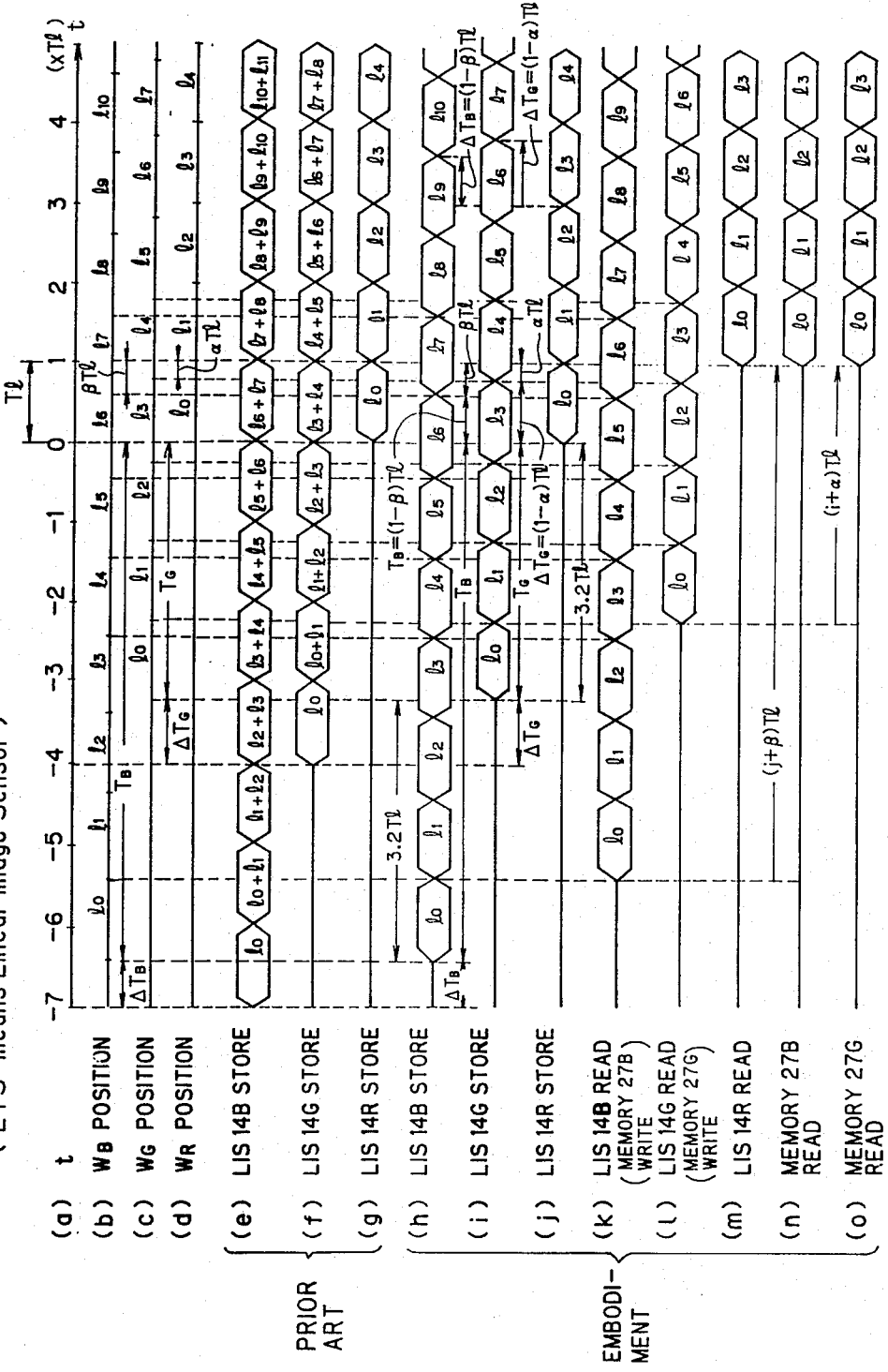
FIG. 6 and FIG. 8 are timing charts showning an operation of the embodiment.
Figure 7:
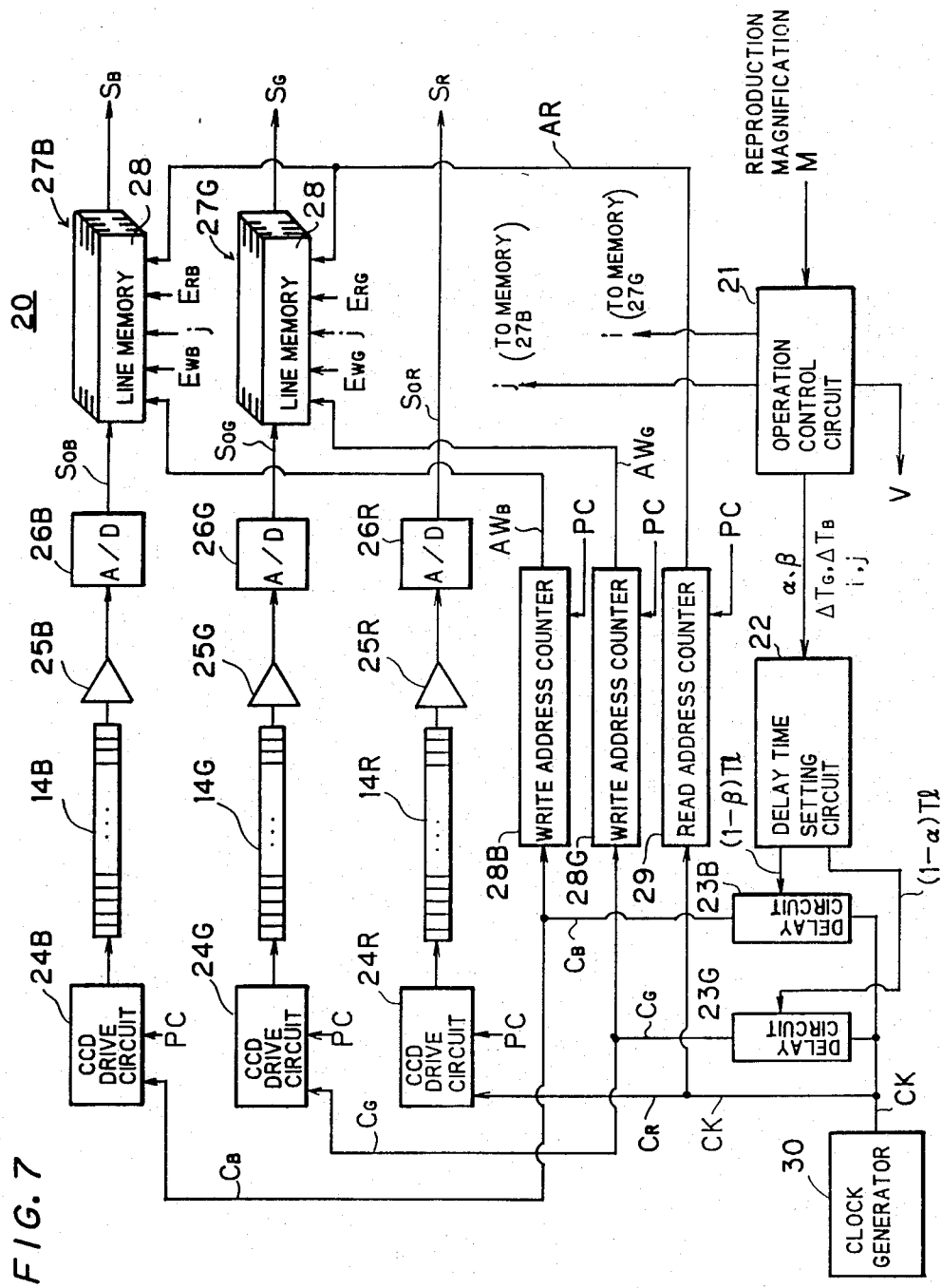
FIG. 7 is a block diagram of a control circuit 20 employed in the embodiment.

After the values of those parameters are determined, the reading operation of the original 1 with a multi-row image sensor 11 is performed as follows: With the progress of the time t as shown in a row (a) of FIG. 6, the instantaneous reading lines $W_B$, $W_G$, $W_R$ of the linear image sensors 14B, 14G and 14R pass through the positions of the scanning lines $l_0$, $l_1$, . . . of FIG. 4B in the timings respectively shown in the rows (b) to (d) of FIG. 6. The time scale in the row (a) of FIG. 6 is so illustrated as to be synchronized with the scan timing by the red component receiving linear image sensor 14R. In FIG. 6 and FIG. 7 which will be explained later, the term of "linear image sensor" is abbreviated as "LIS".

In the example shown in FIG. 4B, the ratio of A/d has the value:

A/d=3.2 and, the displacement or spacing between the reading positions is not integral multiples of the value of the scanning line pitch d. Therefore, if a read timing is common to linear image sensors 14B, 14G and 14R as in the prior art, the linear image sensor 14R reads an image on a regular scanning line as shown in a row (g) of FIG. 6, while the other linear image sensors 14B and 14G read images extending over two neighbouring scanning lines such as $l_3$ and $l_4$, as shown in the rows (e) and (f) of FIG. 6. As a result, a positional color mismatch is caused in a reproduced image, as described below.

In order to overcome the problem, the image reader according to the preferred embodiment is so constructed that each of the linear image sensors 14B, 14G and 14R can regularly read images on the scanning lines, by shifting the CCD charge storage start timings, i.e., the image read timings, in the linear image sensors 14B and 14G.

Namely, as shown in the row (i) of FIG. 6, the charge storage start timing in the green linear image sensor 14G is set to advance from the corresponding charge storage start timing in the red linear image sensor 14R by an adjusted time interval $T_G$ with respect to every scanning line so that the image reading by the green linear image sensor 14G at its instantaneous reading line $W_G$ is adjusted to be commensurate with the scanning lines defined by the read timings in the red linear image sensor 14R. Similarly, as shown in the row (h) of FIG. 6, the charge storage start timing in the blue linear image sensor 14B is set to advance from that in the red linear image sensor 14R by another time interval $T_B$ for every scanning lines so that the blue image sensor 14B can read the image on the scanning lines in the timing in which the instantaneous reading line $W_R$ of the blue linear image sensor 14B passes through the scanning lines defined by the read timings of the red linear image sensor 14R. More particularly, this is achieved by delaying the respective charge storage start timings of the green and blue linear image sensors 14G and 14B by delay times $\Delta T_G$ and $\Delta T_B$ from those of the conventional image reader, respectively. A method to determine the values of the relay times $\Delta T_G$ and $\Delta T_B$ will be described later.

When such a technique is employed, the scanning lines defined by the readings with the linear image sensors 14B, 14G and 14R are common to all of the linear image sensors to give a single set of scanning lines $l_0$, $l_1$, . . . , so that the respective scanning lines of the linear image sensors 14B, 14G and 14R can be matched with each other. Therefore, when the respective color component data obtained through the adjusted reading are combined for each scanning line, a recorded image faithful to the original image can be obtained regardless of the relation between the values of the image reading displacement A and the scanning line pitch d.

The values of the delay time $\Delta T_G$ and $\Delta T_B$ are determined as follows: As understood from FIG. 4B, when the image read start timing of the green linear image sensor 14G for reading the image on the scanning line $l_0$ is so set as to advance from that of the red linear image sensor 14R by the time period required for the original to relatively move by the distance $Y_G$ shown in FIG. 4B, the two linear image sensors 14G and 14R read the image on the common scanning lines. The distance $Y_G$ corresponds to the spacing between the red and green image sensors 14R and 14G. In the case of FIG. 6, the image read start timing of the green image sensor 14G for reading the scanning line $l_0$, for example, is advanced from that of the red linear image sensor 14R by $-3.2$ Tl which is obtained by the expression (1). Similarly, the image read start timing of the blue linear image sensor 14B for reading the image on the scanning line $l_0$ is set to advance from the timing of $t=0$ in FIG. 6 by the time shift corresponding to the distance $Y_B$, as understood from an analysis similar to that for the green linear image sensor 14G. In other words, the values of the reading delay times $\Delta T_G$ and $\Delta T_B$ are so determined as to accord with the times required for the subscanning to progress by the distances $\Delta Y_G$ and $\Delta Y_B$, respectively (see rows (h) and (i) of FIG. 6).

Since the subscanning is so set as to advance by the distance corresponding to the scanning line pitch d in every time period Tl, the following expression (2) holds:

$$d/Tl = \Delta Y_G/\Delta T_G \quad (2)$$
$$= \Delta Y_B/\Delta T_B (= V)$$

By modifying the equation (2), $$\Delta T_G = Tl(\Delta Y_G/d) \quad \ldots (3)$$
$$\Delta T_B = Tl(\Delta Y_B/d) \quad \ldots (4)$$

are obtained. Therefore, the values of the delay times $\Delta T_G$ and $\Delta T_B$ can be obtained by obtaining the values of ($\Delta Y_G/d$) and ($\Delta Y_B/d$) on the right hand side of the expressions (3) and (4), respectively.

The quantities ($\Delta Y_G/d$) and ($\Delta Y_B/d$) indicate how many times the scanning line pitch d the distances $\Delta Y_G$ and $\Delta Y_B$ are, respectively. Supposing that quantities i and $\alpha$ are the integer part and the decimal part of the value (A/d) which is obtained by dividing the image read deviation A between the linear image sensors 14G and 14R by the scanning line pitch d, respectively, and quantities j and $\beta$ are the integer part and the decimal part of the value (2A/d) obtained by deviding the image read deviation 2A between the linear image sensors 14B and 14R by the scanning line pitch d, the following expressions (5) and (6) hold:

$$A/d = i + \alpha(=3.2) \quad \ldots (5)$$
$$2A/d = j + \beta(=6.4) \quad \ldots (6)$$

On the other hand, from FIG. 4B, the expressions:

$$\Delta Y_G = (1-\alpha)d(=0.8d) \quad \ldots (7)$$
$$\Delta Y_B = (1-\beta)d(=0.6d)\text{tm} \ldots (8)$$

also hold. From these equations:

$$\Delta Y_G/d = 1 - \alpha(=0.8) \quad \ldots (9)$$
$$\Delta Y_B/d = 1 - \beta(=0.6) \quad \ldots (10)$$

are obtained. The values in the parentheses in the expressions (5) to (10) and those in the expressions (11) to (16) to be described later are those for the example shown in FIG. 4B and FIG. 6.

Form the expressions (3), (4), (9) and (10):

$$\Delta T_G = Tl(1-\alpha) = (0.8Tl) \quad \ldots (11)$$
$$\Delta T_B = Tl(1-\beta) = (0.6Tl) \quad \ldots (12)$$

are obtained.

The values of the integer parts i and j, and those of the decimal parts $\alpha$ and $\beta$ can be obtained through the following expressions (13) to (16), when a symbol "INT" is defined as an operation to extract an integer part from an arbitrary value by omitting a decimal part thereof.

$$\begin{aligned} i &= INT[A/d] \\ &= INT[D/(md)] \\ (&= 3) \end{aligned} \quad (13)$$

$$\begin{aligned} \alpha &= (A/d) - i \\ &= (A/d) - INT[A/d] \\ &= (D/md) - INT[D/md] \\ (&= 3.2 - 3 = 0.2) \end{aligned} \quad (14)$$

$$\begin{aligned} j &= INT[2A/d] \\ &= INT[2D/md] \\ (&= 6) \end{aligned} \quad (15)$$

$$\begin{aligned} \beta &= (2A/d) - j \\ &= (2A/d) - INT[2A/d] \\ &= (2D/md) - INT[2D/md] \\ (&= 6.4 - 6 = 0.4) \end{aligned} \quad (16)$$

Accordingly, when the respective values of the quantities A, D, m and d are previously decited or measured, the values of the decimal parts $\alpha$ and $\beta$, and therefore, the values of the delay times $\Delta T_G$ and $\Delta T_B$ can be obtained.

The values of the integer parts i and j are used to adjust the output timings at which the color component data obtained from the linear image sensors 14B, 14G and 14R are delivered from the control circuit 20 of FIG. 4A, and details of the process will be described later.

FIG. 7 is a block diagram showing the internal structure of the control circuit 20 of FIG. 4A. The details and the operation of the embodiment will be described, with reference to FIG. 7 and FIG. 4A.

In order to read the image on the original 1, an operator first inputs the value of a desired reproduction magnification factor M into an operation control circuit 21 of FIG. 7, through a keyboard (not shown) or the like. The operation control circuit 21 contains a microcomputor (not shown) etc.. After the value of the reproduction magnification factor M is inputted, the operation control circuit 21 calculates the value of the pitch d from the values of the quantities $d_0$ and M, the values of the quantity $d_0$ being determined previously. Then, the values of the integer part i and j, and those of the decimal parts $\alpha$ and $\beta$ are calculated through the expressions (13) to (16), from the values of M and d, and the previously determined or measured values of m, D, A, Tl and the like. On the basis of the values of the decimal parts $\alpha$ and $\beta$ thus obtained, the values of the delay times $\Delta T_G$ and $\Delta T_B$ are calculated through the expressions (11) and (12).

The value of the speed V at which the original 1 is moved is so obtained as to correspond to the value of the reproduction magnification factor M, through the calculation of ($V_0$/M). The value of the speed V is delivered to the transporting mechanism (not shown) for moving the original 1.

Relations between the value of the reproduction magnification factor M, and the values of the delay times $\Delta T_G$ and $\Delta T_B$ may be expressed numerically to be stored in a memory as a look up table.

The values of the delay times $\Delta T_G$ and $\Delta T_B$, and those of the integer parts i and j obtained in the operation control circuit 21 are transmitted to a delay time setting circuit 22 of FIG. 7. The delay time setting circuit 22 sets the values of the delay times $\Delta T_G$ and $\Delta T_B$ in delay circuit 23G and 23B, respectively.

Figure 8:
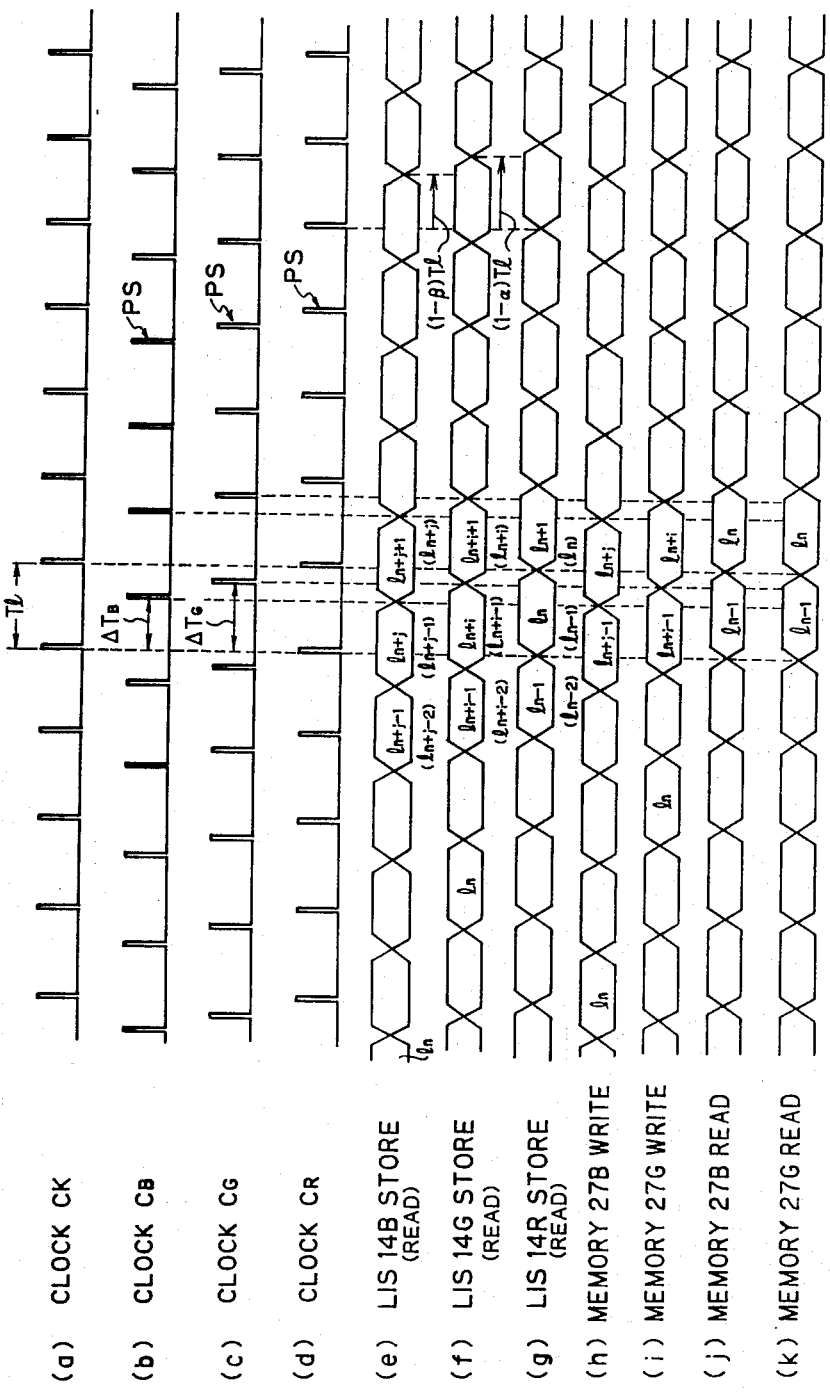

The delay circuit 23G and 23B delay or time-shift a clock CK (the row (a) of FIG. 8) supplied from a clock generator 30 by the delay time $\Delta T_B$ and $\Delta T_G$, to generate line switching clocks $C_B$ and $C_G$ (the rows (b) and (c) of FIG. 8) for the blue and green components, respectively. The blue and green line switching clocks $C_B$ and $C_G$ are supplied to CCD drive circuit 24B and 24G for the blue and green components, respectively. The clock CK is also supplied to a CCD drive circuit 24R for the red component, as a line switching clock $C_R$ (the row (d) of FIG. 8) for the red component. These line switching clocks $C_B$, $C_G$ and $C_R$ are sensor drive timing signals being out of phase from each other by time shift values proportional to the decimal parts $\alpha$ and $\beta$.

In response to the line switching clocks $C_B$, $C_G$ and $C_R$, the CCD drive circuits 24B and 24G and 24R drive the linear image sensors 14B, 14G and 14R, respectively. Every time when a pulse PS of the line switching clock $C_B$ ($C_G$, $C_R$) shown in the row (b) ((c), (d)) of FIG. 8 is supplied, the CCD drive circuit 24B (24G, 24R) terminates one period of the charge storage in the linear image sensor 24B (24G, 24R), the charge stored in the linear image sensor 24B (24G, 24R) is transmitted to an amplifier 25B (25G, 25R), and a charge storage operation with respect to the next scanning line is started.

Such an operation is performed while moving the original 1 in the direction (−Y), so that image reading or charge storage of CCD cells in the linear image sensors 14B, 14G and 14R is achieved. In FIG. 8, the symbol ln represents an n-th scanning line, and the scanning line numbers in the parentheses indicated in the row (e) to (g) of FIG. 8 represent the timing order along which the color component data are outputted from the linear image sensors 14B, 14G and 14R, respectively. Especially, the timings around the reading start operation for the original 1 are illustrated in the rows (h) to (j) of FIG. 6 already described.

The color component signals obtained in the linear image sensors 14B, 14G and 14R are amplified in the amplifiers 25B, 25G and 25R for each scanning line, and then converted into digital signals in A/D converters 26B, 26G and 26R, to become digital color component data $S_{0B}$, $S_{0G}$, $S_{0R}$, respectively. Within these digital color data, blue and green component data $S_{0B}$ and $S_{0G}$ are stored in memories 27B and 27G, respectively. The memories 27B and 27G have $N_B$ and $N_G$ units of a line memory 28 having a storage capacity corresponding to the number of pixels in the main scanning direction, respectively. The numbers $N_B$ and $N_G$ are so determined as to be integers larger by at least two than the respective maximum values of the integer parts j and i in their ranges corresponding to a practical range of the reproduction magnification factor M, respectively.

In the memories 27B and 27G, the numbers of the line memories 28 currently used are determined according to the values of the integer parts j and i previously supplied from the delay time setting circuit 22, respectively. More particularly, (j+2) units of the line memory 28 are selected in the blue memory 27B to be cyclically used for each scanning line. Such an operation can be achieved by employing dual port RAM's as the memories. Similarly, (i +2) units of the line memory 28 are selected in the green memory 27G to be used cyclically for each scanning line.

Write addresses $AW_B$ and $AW_G$ at which the color component data are to be written in the memories 27B and 27G are designated by address signals supplied from write address counters 28B and 28G, respectively. The write address counters 28B and 28G are reset by the delayed line switching signals $C_B$ and $C_G$, and then count pixel clock pulses PC to define the addresses $AW_B$ and $AW_G$ by the counted values, respectively. Write switching signals $EW_B$ and $EW_G$ for switchingly select one or more line memories 28 of the memories 27B and 27G in which the color component data are to be written are supplied to the memories 27B and 27G in synchronism with the line switching clocks $C_B$ and $C_G$, respectively.

The blue and green component data $S_{0B}$ and $S_{0G}$ given from the A/D converters 26B and 26G are stored in the memories 27B and 27G (the rows (h) and (i) of FIG. 8, and the rows (k) and (l) of FIG. 6), in the timings respectively delayed by one line scanning period from the charge storage operations in the linear image sensors 14B and 14G, respectively. The delays by one line scanning period are caused in order for the stored charges in the linear image sensors 14B, 14G and 14R to be transmitted to transmission gates (not shown) to be outputted. The delay is also caused in the red component data $S_{0R}$, and these delays caused by the charge transmission are different from the delays for relatively adjusting the color component read timings corresponding to the character of the present invention.

As shown the rows (n) and (o) of FIG. 6, the blue and green component data $S_{0B}$ and $S_{0G}$ stored in the memories 27B and 27G respectively are delayed therein by $(j+\beta)$ Tl and $(i+\alpha)$ Tl from the respective write timings, and then outputted therefrom in synchronism with the output timing of the red component data $S_{0R}$ (the row (m) of FIG. 6) from the red line image sensor 14R. Namely, since the red component data $S_{0R}$ is outputted from the linear image sensor 14R at latest timing within the color component data $S_{0B}$, $S_{0G}$ and $S_{0R}$ of a common scanning line, which is the scanning line $l_0$, for example, the other color component data $S_{0B}$ and $S_{0G}$ are outputted from the memories 27B and 27G in the timings fitting the output timing of the red component data $S_{0R}$.

The delaying process can be achieved by employing the output of a read address counter 29 as data read addresses $AR_B$ and $AR_G$ for the memories 27B and 27G. The read address counter 29 is so constructed as to be reset by the clock CK also serving as the red line switching clock $C_R$ and to count the pixel clock PC. Read switching signals $E_{RB}$ and $E_{RG}$ for switchingly selecting one of the line memories 28 from which the color component data is to be read out are also given to the memories 27B and 27G, respectively, in synchronism with the clock CK.

Figure 9:
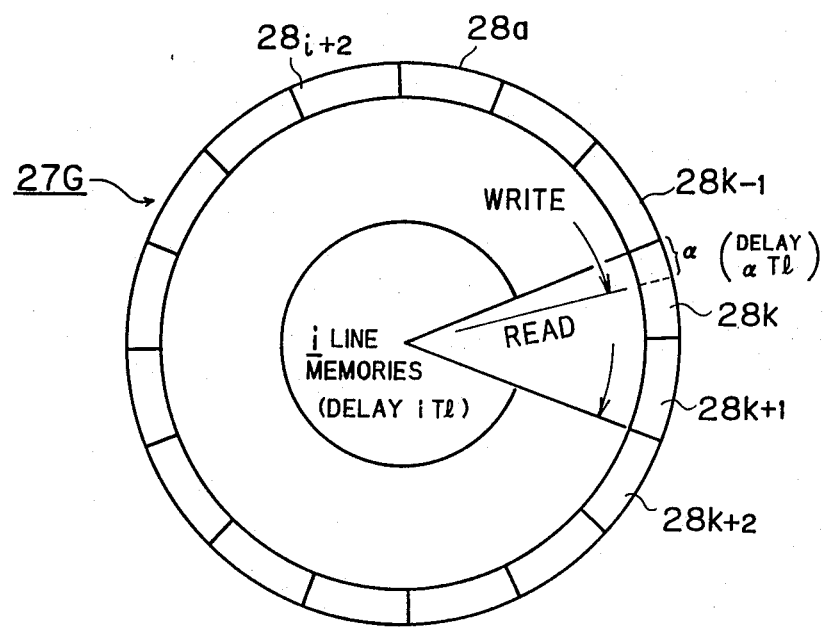
FIG. 9 is a conceptional diagram of a memory used to adjust an output timing of color component data.

For example, output operation of the green memory 27G is hereinafter described referring to a schematical diagram shown in FIG. 9. In the green memory 27G, the reading operation is carried out on a line memory $28_{k+1}$ being in next order to a line memory $28_k$ currently subjected to the writing operation, when (i+2) units of line memories $28_a$ to $28_{i+2}$ are used cyclically for each scanning line. Accordingly, a total time delay of $(i+\alpha)$ Tl is obtained in the state shown in FIG. 9, since:

(i) between the line memories $28_{k+1}$ and $28_k$, green component data $S_{0G}$ of i scanning lines are stored in the i line memories $28_{k+2}$ to $28_{i+2}$ and $28_a$ to $28_{k-1}$, and (ii) owing to the deviation between the line switching clock $C_G$ and the clock CK, $\alpha$ part within green component data of one scanning line to be stored in the line memory $28_k$ is already written therein.

Similar situation is present also in the blue memory 27B. As understood from FIG. 9, if each of the line memories 28 is so constructed that writing and reading can be performed in parallel, the memories 27G and 27B may have only(i +1) line memories.

Through the technique described above, blue and green component data $S_B$ and $S_G$ obtained by delaying the transmission timings of the color component data $S_{0B}$ and $S_{0G}$ respectively, and red component data $S_R$ identical to the transmitted red component $S_{0R}$ are outputted from the circuit 20 in the timings shown in the rows (m) to (o) of FIG. 6 and the rows (g), (j) and (k) of FIG. 8, where line numbers corresponding the operation are indicated with parentheses in the row (g) of FIG. 8, so that the color component data $S_B$, $S_G$ and $S_R$ with respect to a common scanning line are outputted from the circuit 20 in synchronism with each other, to an arbitrary image processing device (not shown) provided in the rear stage of the image reader 20.

Therefore, when the color component data $S_B$, $S_G$ and $S_R$ are combined to be employed in an image recording, no positional color mismatch appears in the recorded image.

Although the read timings in the blue and green linear image sensors 14B and 14G are delayed by $(1-\beta)$ Tl and $(1-\alpha)$ Tl in the above described embodiment, respectively, the read timings of the green and red linear image sensors 14G and 14R may be delayed by $(\beta-\alpha)$ Tl and $\beta$Tl, respectively, without delay in the blue linear image sensor 14B. Further, the read timings in the blue and red image sensors 14B and 14R may be delayed by $(1-\beta+\alpha)$ Tl and $\alpha$Tl, respectively, without delay in the green linear image sensor 14G which is positioned in the center of the sensor arrangement.

However, it is preferred to delay only the read timings of the blue and green linear image sensors as the above indicated embodiment, since it requires no delay in the read timing of the red linear image sensor 14R which reads the original image on the common scanning line at the latest time, so that output timing delay of the color component data $S_B$, $S_G$ and $S_R$ is minimized.

Figure 10:
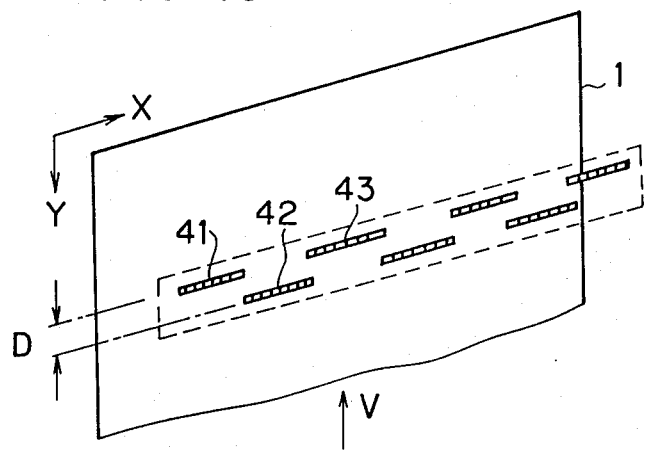
FIG. 10 is an explanatory diagram showing another embodiment of the present invention.

The present invention can be applied to image readers of other types. One of them is illustrated in FIG. 10, in which linear image sensors 41, 42, ... are so arranged as to stagger along the main scanning direction X, and the relatively short linear image sensors 41, 42, ... are combined to read the wide original 1. The respective one of the linear image sensors 41, 42, ... may be constructed as a set of three linear image sensors for three color components.

The linear image sensors may be other type image sensors than those of charge storage type such as the CCD linear image sensors. For example, linear photodiode arrays may be employed under the condition where the image read timings thereof are relatively shifted or distributed according to the rule already described.

The linear image sensors are preferably formed on the common substrate to provide the multi-row image sensor, since the spacings D between the linear image sensors are fixed without secular change to further increase an accuracy in the image reading. However, the linear image sensors may be prepared as those separated from each other and arranged in the subscanning direction.

When it is not required to output the image data obtained in the linear image sensors in real time, the output timing adjuster consisting of the memories 27B and 27G, the write address counters 28B and 28G, and read address counter 29 may be omitted in the image reader. In this case, the timing shifts are given in the process where the color component data $S_B$, $S_G$ and $S_R$ are stored in a mass storage memory, and then the color component data are read out from the mass storage memory for reproduction while shifting the respective read address from each other in synchronized timings. In other words, since a set of image data corresponding to common scanning lines can be obtained at the state where the image data are delivered from the linear image sensors, the image data can be arbitrarily processed to give a desirable image recording.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of reading an image of an original sequentially along scanning lines defined on said original, said method comprising the steps of:
    (a) preparing linear image sensors extending along a main scanning direction and arrayed in a subscanning direction with a predetermined spacing;
    (b) relatively moving said original and said linear image sensors in said subscanning direction so that light from said image of said original is received by said linear image sensors for each scanning line, and
    (c) reading said image of said original with said linear image sensors for each scanning line while performing said step (b), wherein respective read timings in said linear image sensors are controlled by sensor drive timing signals supplied to said linear image sensors, respectively, and said sensor drive timing signals are time-shifted from each other by a time shift value dependent on a decimal part of a characteristic value obtained by dividing a deviation between respective instantaneous reading positions of said linear image sensors in said subscanning direction by a scanning line pitch with which said scanning lines are arrayed in said subscanning direction.

2. A method in accordance with claim 1, wherein
said time shift value is Tl (1-γ), where Tl is the time required for said linear image sensors to read said image of said original by one scanning line, and γ is said decimal part.

3. A method in accordance with claim 2, wherein
said linear image sensors have first and second linear image sensors,
said sensor drive timing signals include first and second sensor drive timing signals supplied to said first and second linear image sensors, respectively,
said first linear image sensor receives light from said image of said original at the latest timing within said linear image sensors when said original and said linear image sensors are moved relatively according to said step (b), and
said second sensor drive timing signal is delayed by said time shift value from said first sensor drive timing signal.

4. A method of reading an image of an original sequentially along scanning lines defined on said original, said method comprising the steps of:
(a) preparing linear image sensors extending along a main scanning direction and arrayed in a subscanning direction with a predetermined spacing;
(b) relatively moving said original and said linear image sensors in said subscanning direction so that light from said image of said original is received by said linear image sensors for each scanning line, and
(c) reading said image of said original with said linear image sensors for each scanning line while performing said step (b), wherein respective read timings in said linear image sensors are controlled by sensor drive timing signals supplied to said linear image sensors, respectively, and said sensor drive timing signals are time-shifted from each other by a time shift value dependent on a decimal part of a characteristic value obtained by dividing a deviation between respective instantaneous reading positions of said linear image sensor in said subscanning direction by a scanning line pitch with which said scanning lines are arrayed in said subscanning direction;
said time shift value is Tl (1-γ), wherein Tl is the time required for said linear image sensors to read said image of said original by one scanning line, and γ is said decimal part;
said linear image sensors have first and second linear image sensors,
said sensor drive timing signals include first and second sensor drive timing signals supplied to said first and second linear image sensors, respectively,
said first linear image sensor receives light from said image of said original at the latest timing within said linear image sensors when said original and said linear image sensors are moved relatively according to said step (b), and
said second sensor drive timing signal is delayed by said time shift value from said first sensor drive timing signal,
said linear image sensors further include a third linear image sensor, said first to third linear image sensors being adapted to read different color components of said image, respectively,
said sensor drive timing signals further include a third sensor drive timing signal supplied to said third linear image sensor, and wherein
said second and third sensor drive timing signals are delayed from said first sensor drive timing signal by first and second time shift values, respectively, said first and second time shift values being individually obtained on the basis of a first deviation between respective instantaneous reading positions of said first and second linear image sensors and a second deviation between respective instantaneous reading positions of said first and third linear image sensors, respectively.

5. A method in accordance with claim 4, wherein
said sensor driving timing signals are clock signals with which respective image reading operations of said linear image sensors are synchronized, respectively.

6. A method in accordance with claim 5, wherein
said first, second and third linear image sensors respectively output first, second and third color component image data obtained by reading said image of said original,
said first color component image data is transmitted to a prescribed device provided in a rear stage of said linear image sensors without substantial delay,
said second color component image data is input to first delay means for delaying a transmission of said second color component image data to said device by a first delay time proportional to an integer part of said characteristic value obtained on the basis of said first deviation,
said third color component image data is input to second delay means for delaying a transmission of said third color component image data to said device by a second delay time proportional to an integer part of said characteristic value obtained on the basis of said second deviation,
said second and third color component image data are outputted from said first and second delay means, respectively, in timings synchronized with a transmission of said first color component image data to said device, whereby said first to third color component image data corresponding to common scanning lines are transmitted to said device synchornously.

7. A method in accordance with claim 6, wherein
said linear image sensors are formed on a common substrate in parallel to each other, thereby to be prepared as a multi-row image sensor.

8. A method in accordance with claim 7, wherein
said deviation between said respective instantaneous reading positions of said linear image sensors is not an integer times said scanning line pitch.

9. An image reader for reading an image of an original sequentially along scanning lines defined on said original, said image reader comprising:
(a) linear image sensors extending along a main scanning direction and arrayed in a subscanning direction, said linear image sensors being adapted to receive light from said image of said original moved relatively along said subscanning direction,
(b) sensor drive timing signal generating means for generating sensor drive timing signals supplied to said linear image sensors to control image read timings in said linear images sensors, respectively, said sensor drive timing signals being time-shifted from each other by a time shift value dependent on a decimal part of a characteristic value obtained by dividing a deviation between respective instantaneous reading positions of said linear image sensors in said subscanning direction by a scanning line pitch with which said scanning lines are arrayed in said subscanning direction, and (c) transmission means for transmitting image data obtained in said linear image sensors by reading said image of said original to an exterior of said image reader.

10. An image reader in accordance with claim 9, wherein said time shift value is Tl (1 - γ), where Tl is the time required for said linear image sensors to read said image of said original by one scanning line, and γ is said decimal part.

11. An image reader in accordance with claim 10, wherein said linear image sensors have first and second linear image sensors, said sensor drive timing generating means includes first and second sensor drive timing generators generating first and second sensor drive timing signals supplied to said first and second linear image sensors, respectively, said first linear image sensor receives light from said image of said original at latest timing within said linear image sensors when said original and said linear image sensors are moved relatively according to said step (b), and said second sensor drive timing generator is coupled to said first sensor drive timing generator for delaying said first sensor drive timing signal by said time shift value to generate said second sensor drive timing signal.

12. An image reader for reading an image of an original sequentially along scanning lines defined on said original, said image reader comprising:

(a) linear image sensors extending along a main scanning direction and arrayed in a subscanning direction, said linear image sensors being adapted to receive light from said image of said original moved relatively along said subscanning direction, (b) sensor drive timing signal generating means for generating sensor drive timing signals supplied to said linear image sensors to control image read timings in said linear images sensors, respectively, said sensor drive timing signals being time-shifted from each other by a time shift value dependent on a decimal part of a characteristic value obtained by dividing a deviation between respective instantaneous reading positions of said linear image sensors in said subscanning direction by a scanning line pitch with which said scanning lines are arrayed in said subscanning direction, and (c) transmission means for transmitting image data obtained in said linear image sensors by reading said image of said original to an exterior of said image reader, said time shift value is Tl (1 - γ), where Tl is the time required for said linear image sensors to read said image of said original by one scanning line, and γ is said decimal part, said linear image sensors have first and second linear image sensors, said sensor drive timing generating means includes first and second sensor drive timing generators generating first and second sensor drive timing signals supplied to said first and second linear image sensors, respectively, said first linear image sensor receives light from said image of said original at latest timing within said linear image sensors when said original and said linear image sensors are moved relatively according to said step (b), and said second sensor drive timing generator is coupled to said first sensor drive timing generator for delaying said first sensor drive timing signal by said time shift value to generate said second sensor drive timing signal, said linear image sensor further include a third linear image sensor, said first to third linear image sensors being adapted to read different color components of said image, respectively, said sensor drive timing signal generating means further includes a third sensor drive timing signal generator for generating a third sensor drive timing signal supplied to said third linear image sensor, and said second and third sensor drive timing signal generators include first and second delay circuit coupled to said first sensor drive timing signal generator for delaying said first sensor drive timing signal by first and second time shift values to generate said second and third sensor drive timing signals, respectively, said first and second time shift values being individually obtained on the basis of a first deviation between respective instantaneous reading positions of said first and second linear image sensors and a second deviation between respective instantaneous reading positions of said first and third linear image sensors, respectively.

13. An image reader in accordance with claim 12, wherein said sensor driving timing signals are clock signals with which respective image reading operations of said linear image sensors are synchronized, respectively.

14. An image reader in accordance with claim 13, wherein said first, second and third linear image sensors output first, second and third color component image data obtained by reading said image of said original, respectively, said first color component image data is outputted from said image reader without substantial delay, said transmission means includes (c-1) first delay means coupled to said second linear image sensor for delaying a transmission of said second color component image data to the exterior of said image reader by a first delay time proportional to an integer part of said characteristic value obtained on the basis of said first deviation, and (c-2) second delay means coupled to said third linear image sensor for delaying a transmission said third color component image data to the exterior of said image reader by a second delay time proportional to an integer part of said characteristic value obtained on the basis of said second deviation, and said second and third color component image data are outputted from said first and second delay means, respectively, in timings synchronized with a transmission of said first color component image data to the exterior of said image reader, whereby said first to third color component image data corresponding to common scanning lines are transmitted to the exterior of said image reader synchronously.

15. An image reader in accordance with claim 14, wherein said linear image sensors are formed on a common substrate in parallel to each other, thereby to be prepared as a multi-row image sensor.

16. An image reader in accordance with claim 15, wherein said deviation between said respective instantaneous reading positions of said linear image sensors is not an integer times said scanning line pitch.

* * * * *